US012537127B2

(12) United States Patent
Liu et al.

(10) Patent No.: US 12,537,127 B2
(45) Date of Patent: Jan. 27, 2026

(54) MAGNETIC COMPONENT STRUCTURE WITH THERMAL CONDUCTIVE FILLER

(71) Applicant: CYNTEC CO., LTD., Hsinchu (TW)

(72) Inventors: Chun-Tiao Liu, Hsinchu (TW); Hsieh-Shen Hsieh, Hsinchu (TW); Shao-Wei Chang, Hsinchu (TW); Jinping Zhou, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 1020 days.

(21) Appl. No.: 17/671,561

(22) Filed: Feb. 14, 2022

(65) Prior Publication Data

US 2023/0014778 A1 Jan. 19, 2023

(30) Foreign Application Priority Data

Jul. 13, 2021 (CN) ........................ 202110788983.X

(51) Int. Cl.
*H01F 27/30* (2006.01)
*H01F 27/26* (2006.01)
*H01F 27/28* (2006.01)
*H01F 27/32* (2006.01)

(52) U.S. Cl.
CPC ......... *H01F 27/2876* (2013.01); *H01F 27/26* (2013.01); *H01F 27/30* (2013.01); *H01F 27/325* (2013.01)

(58) Field of Classification Search
CPC ...... H01F 27/2876; H01F 27/26; H01F 27/30; H01F 27/325; H01F 3/14; H01F 27/22; H01F 27/327; H01F 27/24; H01F 27/266
USPC ........................... 336/55–65, 83, 890, 92, 96
See application file for complete search history.

(56) References Cited

U.S. PATENT DOCUMENTS

2016/0189846 A1* 6/2016 Miyauchi ................ H01F 27/22
336/61
2016/0217899 A1* 7/2016 Miyauchi ................ H01F 37/00
2020/0286667 A1* 9/2020 Lai ........................ H01F 27/306

FOREIGN PATENT DOCUMENTS

TW I566265 B 1/2017

* cited by examiner

*Primary Examiner* — Tuyen T Nguyen
(74) *Attorney, Agent, or Firm* — Winston Hsu

(57) ABSTRACT

A magnetic component structure with thermal conductive filler, including two magnetic cores combining together to form an inner accommodating space and at least one core opening, two plate portions connect each other through an inner leg structure and two outer leg structures, a bobbin sleeving on the inner leg structure, a coil winding on the bobbin, a bobbin housing surrounding the bobbin and the coil winding and form winding opening facing the at least one core opening, gaps are formed between the encasing structure constituted by the bobbin housing and the bobbin sleeving and the magnetic cores, a thermal conductive filler formed between the bobbin and the bobbin housing and encapsulating at least parts of the coil winding, and a cooling surface contacts the magnetic cores and the thermal conductive filler, the thermal conductive filler extends outwardly to contact the cooling surface through the opening and the winding opening.

16 Claims, 11 Drawing Sheets

MAGNETIC COMPONENT STRUCTURE WITH THERMAL CONDUCTIVE FILLER

BACKGROUND OF THE INVENTION

1. Field of the Invention

The present invention is generally related to a magnetic component structure, and more specifically, to a magnetic component structure with thermal conductive filler.

2. Description of the Related Art

Magnetic component for example transformer or inductor, also called reactor, is a passive multi-terminal electrical component which resists changes in electric current passing through it. It consists of a conductor such as a wire, usually wound into a coil. When a current flows through it, energy is stored temporarily in a magnetic field in the coil. When the current flowing through an inductor changes, the time-varying magnetic field induces a voltage in the conductor according to Faraday's law of electromagnetic induction, which opposes the change in current that created it. Many magnetic components have a magnetic core made of iron or ferrite inside the coil, which serves to increase the magnetic field and thus the inductance.

Magnetic components are widely used in alternating current (AC) electronic equipment, particularly in radio equipment, power transfer or power isolation. For example, inductors are used to block the flow of AC current while allowing DC to pass. The inductors designed for this purpose are called chokes. They are also used in electronic filters to separate signals of different frequencies, and in combination with capacitors to make tuned circuits.

The development and popularity of 5G wireless systems and automotive electronics offer a huge business opportunity to those industries in the field. Extreme demand for passive components like inductors or transformer makes them in quite short supply. However, the magnetic components would generate heat in practical operation due to power dissipation, especially for the magnetic components with high power and high power density. 5G wireless systems and automotive electronics need stricter specifications and requirements for the characteristics of magnetic component. For example, how to effectively and quickly dissipate the heat generated by coils and magnetic cores in the magnetic component becomes a critical issue, since increased amount of heat generation and accumulation may rise the temperature of magnetic component in operation and deteriorate their performance, or eventually, burn down the whole device. Furthermore, since the coefficients of thermal expansion of magnetic cores and filler in the magnetic component structure are inconsistent and the material of magnetic cores is hard and fragile, the magnetic cores are susceptible to the pressing of filler when temperature varies, thereby cracking the magnetic cores. Accordingly, there is a need for an improved construction for dissipating heat from magnetic cores and coils in magnetic component.

SUMMARY OF THE INVENTION

In order to improve the thermal dissipation of magnetic components, the present invention hereby provides a magnetic component structure with thermal conductive filler, with features that potting wouldn't affect the magnetic cores, the heat are dissipated respectively from the magnetic cores and coils in order to prevent the coil from heating the magnetic cores, and performing local potting for high power-consuming, high thermal-energy coil windings, gaps are presented between the coil winding and the magnetic cores in order to prevent the heat being conducted to the magnetic cores from the coil. In addition, metal spring plate can provide both the functions of mechanical clamping and thermal dissipation. The heat may be dissipated from the magnetic cores through the metal spring plates, and the magnetic cores may be fixed by the metal spring plates.

The purpose of present invention is to provide a magnetic component structure with thermal conductive filler, including the components of two magnetic cores assembling together to form an inner accommodating space and at least one core opening and with two plate portions connecting each other through an inner leg structure and two outer leg structures, wherein the inner leg structure is in said inner accommodating space, a bobbin sleeving on the inner leg structure, a coil winding on the bobbin, a bobbin housing surrounding the bobbin and the coil winding to form at least one winding opening facing the at least one core opening, wherein gaps are formed between the magnetic cores and an encasing structure constituted by the bobbin housing and the bobbin, a thermal conductive filler formed between the bobbin and the bobbin housing and encapsulating at least parts of the coil winding, and a cooling surface contacting the magnetic cores and the thermal conductive filler, and the thermal conductive filler extending outwardly to contact the cooling surface through the at least one core opening and the at least one winding opening.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute apart of this specification. The drawings illustrate some of the embodiments and, together with the description, serve to explain their principles. In the drawings.

Figure 1:
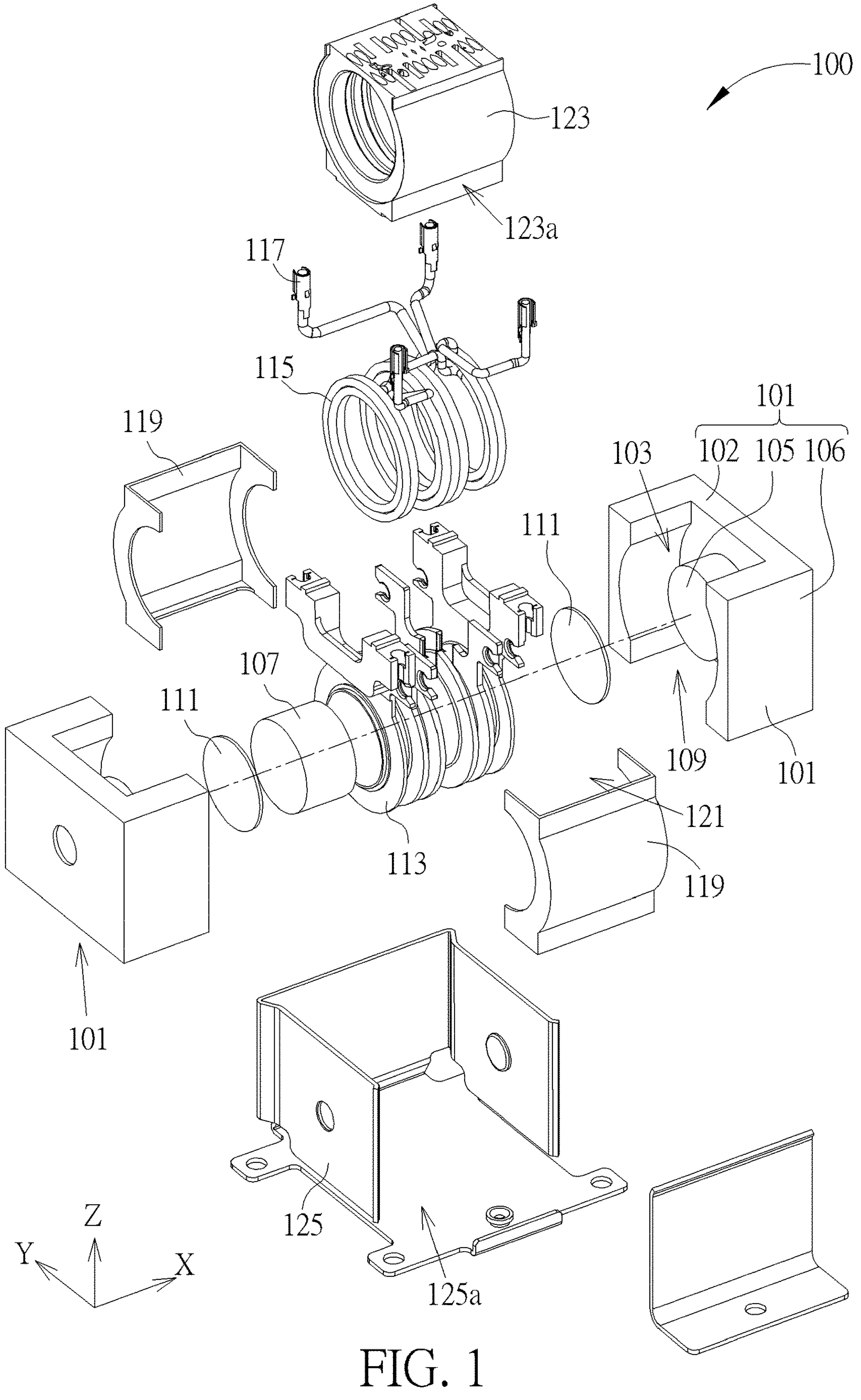
FIG. 1 is an exploded view of a magnetic component structure with thermal conductive filler in accordance with one preferred embodiment of the present invention.

It should be noted that all the figures are diagrammatic. Relative dimensions and proportions of parts of the drawings have been shown exaggerated or reduced in size, for the sake of clarity and convenience in the drawings. The same reference signs are generally used to refer to corresponding or similar features in modified and different embodiments.

DETAILED DESCRIPTION

In following detailed description of the present invention, reference is made to the accompanying drawings which form a part hereof and is shown by way of illustration and specific embodiments in which the invention may be practiced. These embodiments are described in sufficient details to enable those skilled in the art to practice the invention. Dimensions and proportions of certain parts of the drawings may have been shown exaggerated or reduced in size, for the sake of clarity and convenience in the drawings. Other embodiments may be utilized and structural, logical, and electrical changes may be made without departing from the scope of the present invention. The following detailed description, therefore, is not to be taken in a limiting sense, and the scope of the present invention is defined by the appended claims.

Please refer to FIG. 1, which is an exploded view of a magnetic component structure with thermal conductivity filler in accordance with one preferred embodiment of the present invention. FIGS. 2-5 may also be referred collectively with FIG. 1 to provide a better understanding about the configuration of the magnetic component structure after assembly, the cross-sectional composition in different orientations and relative positions and arrangements of elements in the magnetic component structure of the present invention, wherein FIGS. 2-5 are an isometric view and cross-sectional views in X, Y, Z directions of a magnetic component structure after assembly in accordance with one embodiment of the present invention.

The magnetic component structure 100 of the present invention include two external, opposite magnetic cores 101 with shapes corresponding to each other and capable of assembling designedly to form an inner accommodating spacer 103 to accommodate and fix other components of the magnetic component structure 100. Preferably, each magnetic core 101 is provided with a plate portion 102, an end leg part 105 and two outer leg parts 106, wherein the end leg part 105 may be aligned and connected with a middle leg part 107 to constitute an inner leg structure (as 108 shown in FIGS. 4 and 5) extending in a X direction for a bobbin to be sleeved thereon, while two sets of the connecting outer leg parts 106 constitute two outer leg structures. In the present invention, an inner accommodating space 103 is formed between the two outer leg structures, wherein the inner leg structure 108 is set within the inner accommodating space 103. The cross-section of inner leg structure 108 may be circle, ellipse, oval or rectangle, etc., or located at center of the plate portion. Spacers 111 and/or the middle leg part 107 may be optionally set in the center inner leg structure 108. In the embodiment, spacers 111, such as ceramic spacer or mica spacer with thermal resistance (for high temperature operation) and non-magnetic permeability, may be set between the middle leg part 107 and the end leg parts 105 to separate the two parts, which will be further described in later paragraphs relevant to the coil winding. The magnetic core 101 is further provided with at least one core opening 109 (as the upper core opening shown in FIG. 2) to allow the outward extension of internal components. The magnetic component structure 100 of present invention may adopt various magnetic cores 101, for example, EE core, UE core, UUI core, EI core, FF core, FL core, EQ core, EP core, ER core, ETD core, PM core and PQ core, wherein the outer leg structures and the inner leg structure 108 may be parts of the two magnetic cores 101, or may be individual, single outer leg structure or inner leg structure, or may be constituted by several leg parts of the magnetic cores. The present invention is compatible to all of these designs. The material of magnetic core 101 may be iron dust core with low magnetic permeability, such as Fe—Si alloy and Fe—Ni alloy, or ferrite core with higher magnetic permeability. Shape of the outer leg structure may be wall type. Shape of the inner leg structure may be post type.

Figure 2:
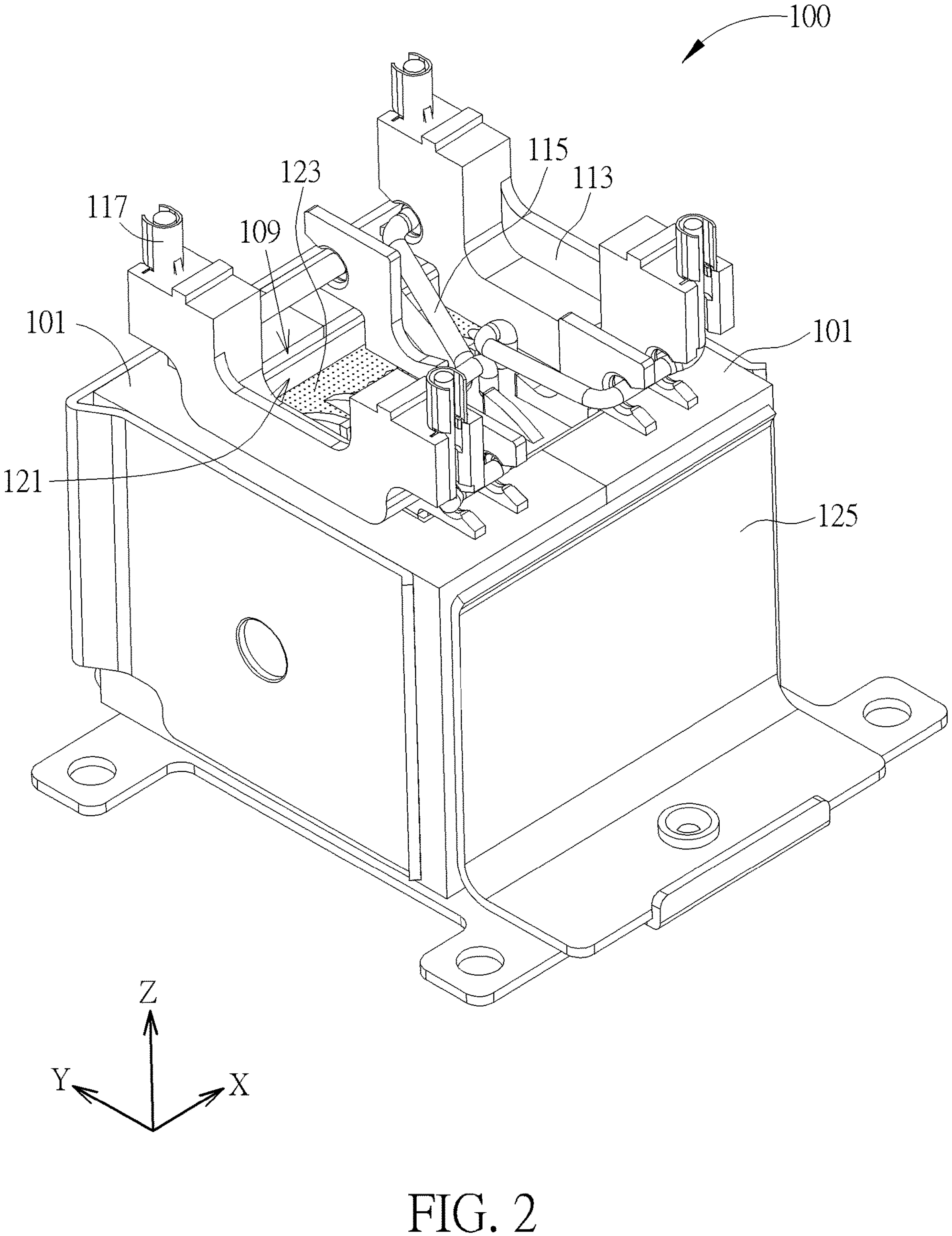
FIG. 2 is an isometric view of the magnetic component structure after assembly in accordance with the preferred embodiment of the present invention.
Figure 4:
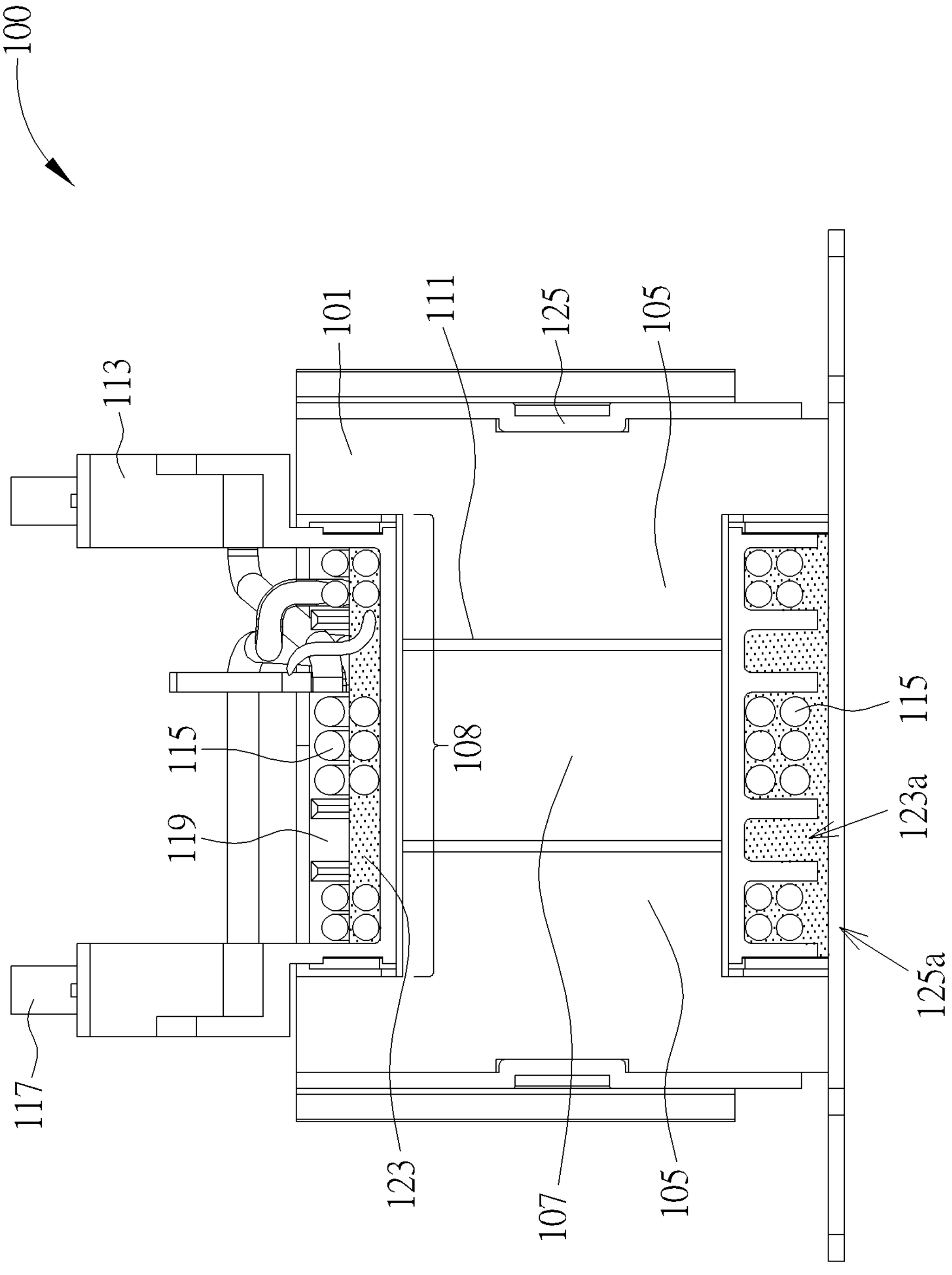
FIG. 4 is a cross-sectional view of the magnetic component structure after assembly in a Y direction in accordance with the preferred embodiment of the present invention.
Figure 5:
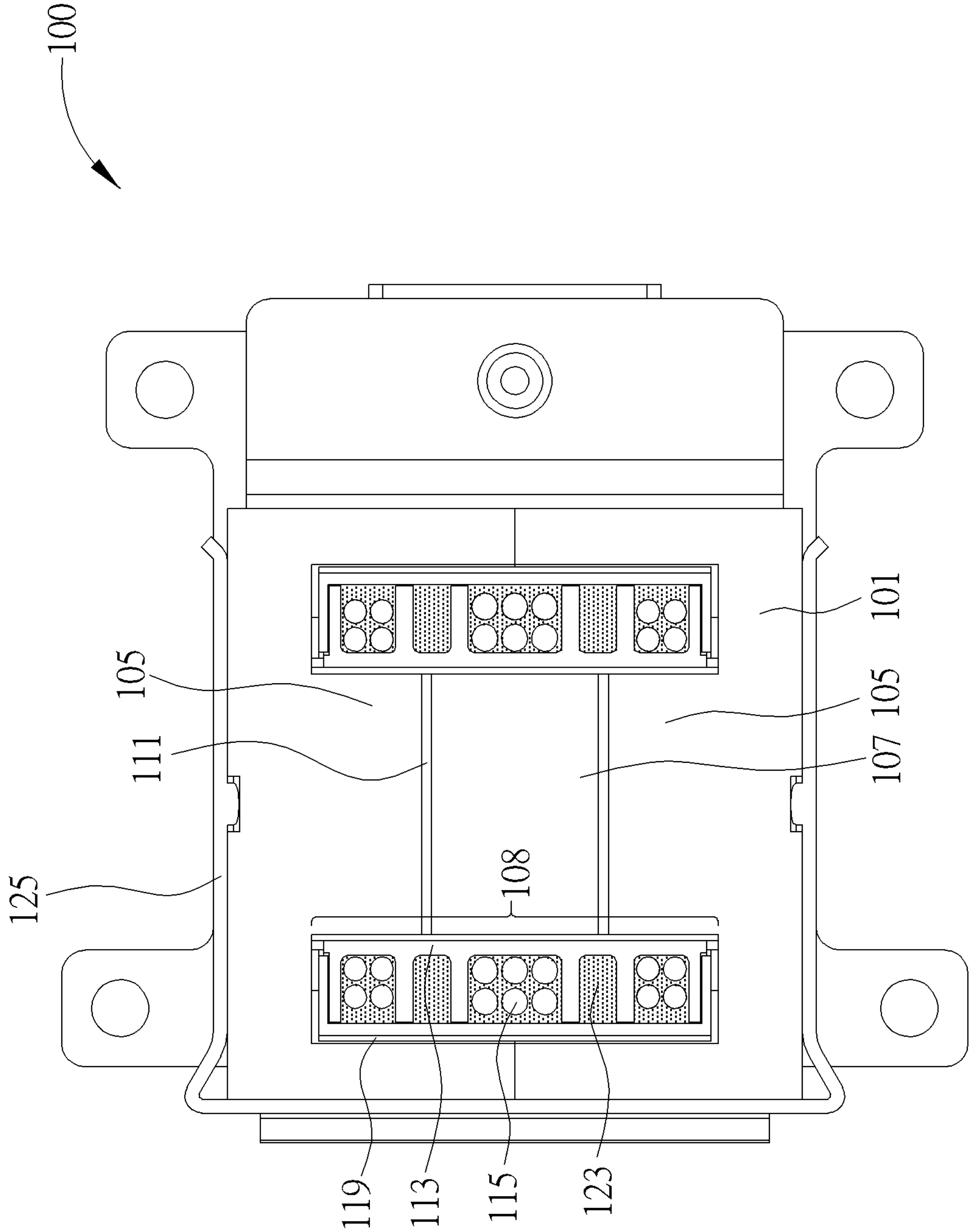
FIG. 5 is a cross-sectional view of the magnetic component structure after assembly in a Z direction in accordance with the preferred embodiment of the present invention.

Among the internal components, a bobbin 113 may be sleeved on the aforementioned inner leg structure 108 (including middle leg part 107 and end leg parts 105 as shown in FIGS. 4 and 5). The bobbin 113 may be in a form of hollow cylinder with dimensions generally designed to be accommodated in the inner accommodating spacer 103 formed in the magnetic cores 101. Bobbin 113 is provided with spaces and routes, such as winding slots, for coils to be wound therein or thereon. It may also be provided with connecting terminals like metal pins to function like supports in coil winding and to provide conductive paths in PCB board soldering. Features like convexity, concavity and chamfer may also be provided in the structure to decide placement direction and pin order. The aforementioned features like metal pin, convexity or concavity in bobbin 113 may extend outside of the magnetic cores 101 through the core opening 109 (as shown in FIG. 2). The bobbin 113 in the embodiment of present invention may be horizontal type or vertical type, with material like thermal resistant and high strength polyphenylene Sulfide (PPS), phenolic resins (bakelite) or engineering plastics. Coil 115 is wound and assembled on the bobbin 113, with its terminals 117 mounted on the convexity of the bobbin 113 and extending outside of the magnetic cores through the core opening 109, as shown in FIG. 2. The type of coil 115 in the present invention may be copper sheet, copper foil, round wire, flat wire or stranded wire (Litz wire), like the coil 115 in the form of round wires shown in the embodiment. The coil 115 of present invention may be provided with several specific windings at relative positions with respect to the inner leg structure 108, which will be further described in later paragraphs relevant to the coil winding.

In addition to the aforementioned bobbin 113 and coil 115, internal components may further include bobbin housing 119 surrounding the winding slots of bobbin 113 and the coil 115. Bobbin housing 119 may be two opposite housing parts with a shape designed to correspond the inner accommodating space 103 formed by magnetic cores 101. The Bobbin housing 119 will be fixed in the magnetic cores 101 after assembly and surround most of the bobbin 113 and coil 115. At least one winding opening 121 will be formed after bobbin housing 119 is assembled, which faces or aligns with at least one core opening 109 of the magnetic cores 101. In this way, the bobbin 113 and coil 115 in bobbin housing 119 may extend outside of the magnetic cores 101 sequentially through the winding opening 121 and core opening 109 (as shown in FIG. 2). The material of bobbin housing 119 may be the same as the one of bobbin 113, such as polyphenylene Sulfide, phenolic resins. In the embodiment of present invention, the bobbin housing 119 is used not only to protect and fix the bobbin 113 and coil 115, but also provide the function of molding thermal conductive filler in order to achieve the invention purpose of local potting for the coil windings.

In the embodiment of present invention, thermal conductive filler 123 is formed between the bobbin housing 119 and bobbin 113. The material of thermal conductive filler 123 may be inorganic material with good thermal conductivity, such as epoxy, silicone, polyurethane (PU), or materials with thermal conductivity greater than 0.3 W/mk, such as thermosetting phenolic resins, thermoplastic polyethylene terephthalate (PET), polyamide (PA), polyphenylene sulfide (PPS) and polyetheretherketone (PEEK). In some embodiments, the thermal conductive filler 123 further includes non-magnetic permeable material with higher thermal conductivity, such as ceramic or mica. In the embodiment of present invention, the thermal conductivity of thermal conductive filler 123 is less than the one of magnetic cores 101, for example, high thermal conductivity iron-based material (like Fe—Si alloy, Fe—Ni alloy or ferrite). Preferably, the thermal conductivity of thermal conductive filler 123 is at least ten times higher than the thermal conductivity of magnetic cores 101. The thermal conductivity of bobbin housing 119 is less than the ones of magnetic cores 101 and thermal conductive filler 123. In the embodiment of present invention, the thermal conductive filler 123 may be formed by first assembling the bobbin housing 119 and bobbin 113 (including the coil 115 winding thereon) and then performing a potting process with aforementioned materials. In this step, bobbin housing 119 and bobbin 113 function like molds to shape the thermal conductive filler 123. The potted thermal conductive material is filled in the space between bobbin housing 119 and bobbin 113 and encapsulates the coil 115 winding on the bobbin 113 (as the thermal conductive filler 123 shown in FIGS. 4 and 5). The thermal conductive filler 123 as shown in FIG. 1 is therefore formed after the thermal conductive material solidifies. In the embodiment, preferably, the shaped thermal conductive filler 123 wouldn't exceed the upper winding opening 121 of bobbin housing 119. Instead, the thermal conductive filler 123 would extend outside of the core opening 109 through a lower winding opening 121 of the bobbin housing 119, to the thermal dissipating plate 125 (cooling surface) outsides the magnetic cores 101. The portions like connecting terminals (metal pins), convexities and concavities of the bobbin 113 and terminals 117 of the coil 115 are preferably not encapsulated by the thermal conductive filler 123 in order to extend outside of the magnetic cores 101 through the upper core opening 109 (as shown in FIG. 2).

In the embodiment of present invention, since the presence of bobbin housing 119 and the use of bobbin housing 119 and bobbin 113 as molds to shape the thermal conductive filler 123, the shaped thermal conductive filler 123 would be formed only in the space between the bobbin housing 119 and bobbin 113 and encapsulate the coil 115 in the space without contacting the inner surfaces of magnetic cores 101 in the inner accommodating space 103, and preferably, neither contacting the outer surfaces of magnetic cores 101, so as to achieve required efficacy of local potting for the coil windings in the present invention. The advantage of this design lies in the high power-consuming, high thermal-energy coil windings conducting the thermal energy through the thermal conductive filler 123 with high thermal conductivity. Efficient thermal dissipation may be achieved due to shorter thermal conducting path. Preferably, the thermal conductive filler 123 would not contact the inner core surface in the inner accommodating space 103 of the magnetic cores 101 (as shown in FIG. 5), so that the heat generated by the coil 115 and conducted to the magnetic cores 101 through the thermal conductive filler 123 is decreased, to provide more uniform temperature profile for entire magnetic cores 101, therefore, need not to worry about the core cracking caused by local thermal stress exerted unevenly upon specific portions. Thermal energy resulted from the magnetic core 101 may be dissipated through other methods. In other words, the thermal energy generated by coil 115 and conducted to the thermal dissipating plate 125 through the thermal conductive filler 123 is increased, while the heat generated by the coil 115 and conducted to the magnetic cores 101 through the thermal conductive filler 123 is decreased.

Figure 3:
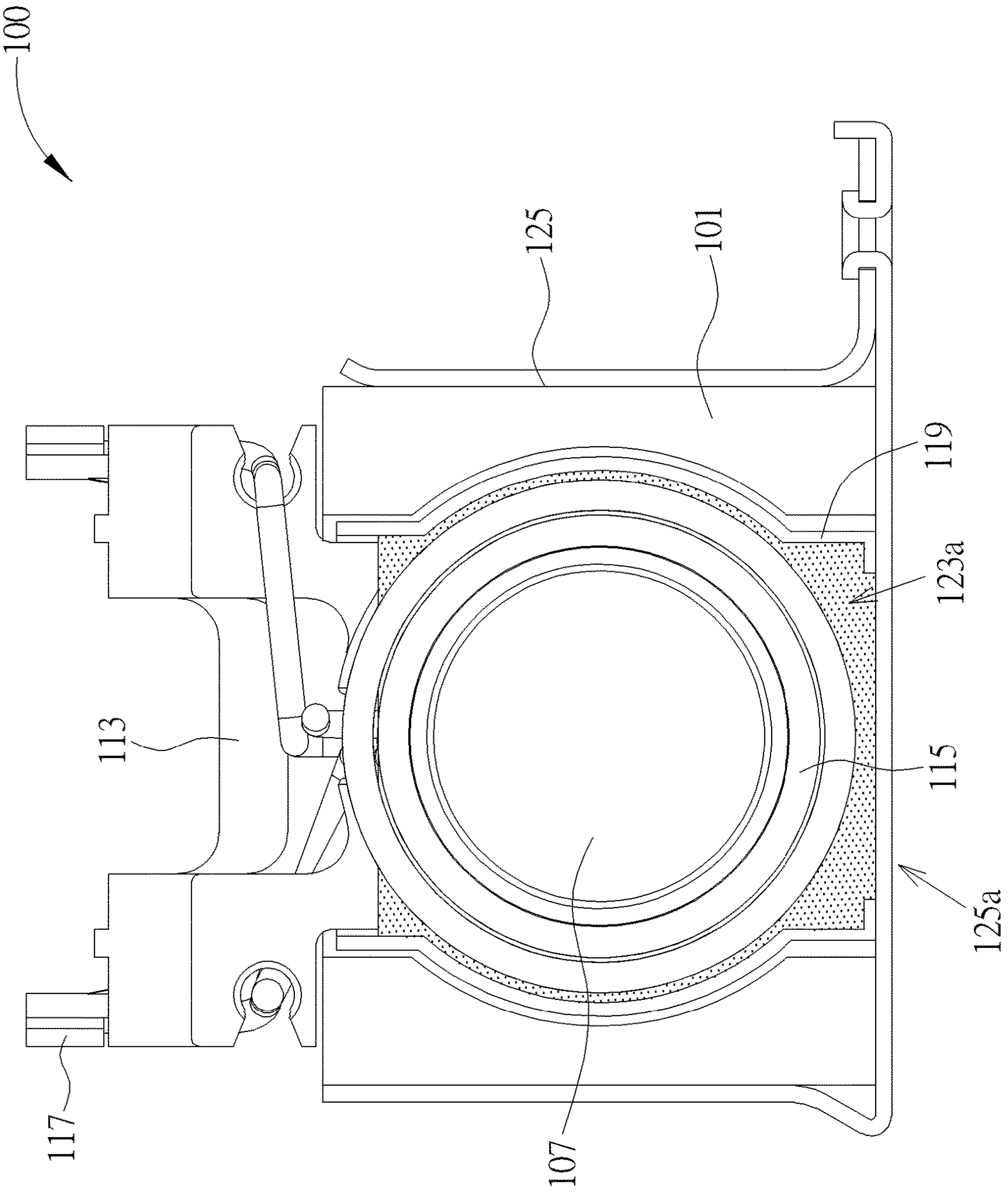
FIG. 3 is a cross-sectional view of the magnetic component structure after assembly in a X direction in accordance with the preferred embodiment of the present invention.

In the embodiment of present invention, the heat generated by the magnetic cores 101 and coil 115 may all be dissipated through an external thermal dissipating plate 125. As shown in FIG. 2, the assembled magnetic component structure 100 is set in the accommodating space provided by the thermal dissipating plate 125, and the thermal dissipating plate 125 may exert elastic force upon the two magnetic cores 101 from outsides to closely contact and fix the two magnetic cores 101 (as shown in FIGS. 4 and 5), so that the heat radiated by the magnetic cores 101 may be dissipated through the thermal dissipating plate 125. When thermal energy produces stress in the magnetic cores 101, the outward stress of the magnetic cores 101 may be extended outwardly to the thermal dissipating plate 125 to lower the stress of the magnetic cores 101, thereby preventing the core cracking. Furthermore, portions of the thermal conductive filler 123, such as bottom portion 123*a*, may extend outwardly to closely contact the thermal dissipating plate 125 (ex. bottom plate 125*a*) through the winding opening 121 and core opening 109 at bottom, so that the heat radiated by the coil 115 may be dissipated sequentially through the thermal conductive filler 123 and the thermal dissipating plate 125 (as shown in FIGS. 3 and 4). Thermal dissipating plate 125 may be high thermal conductive metal spring plate, with material like stainless steel, copper or die casting aluminum (ex. ADC12). The thermal dissipating plate 125 may be further connected with other thermal dissipating device, for example a water cooling system, to further improve its thermal dissipating effectiveness. In some embodiment, thermal dissipating plate 125 may be parts of the thermal dissipating device, and the thermal dissipating surfaces of thermal conductive filler 123 and magnetic cores 101 are thermal-conductively connected to the thermal dissipating plate 125 of the thermal dissipating device.

Figure 6:
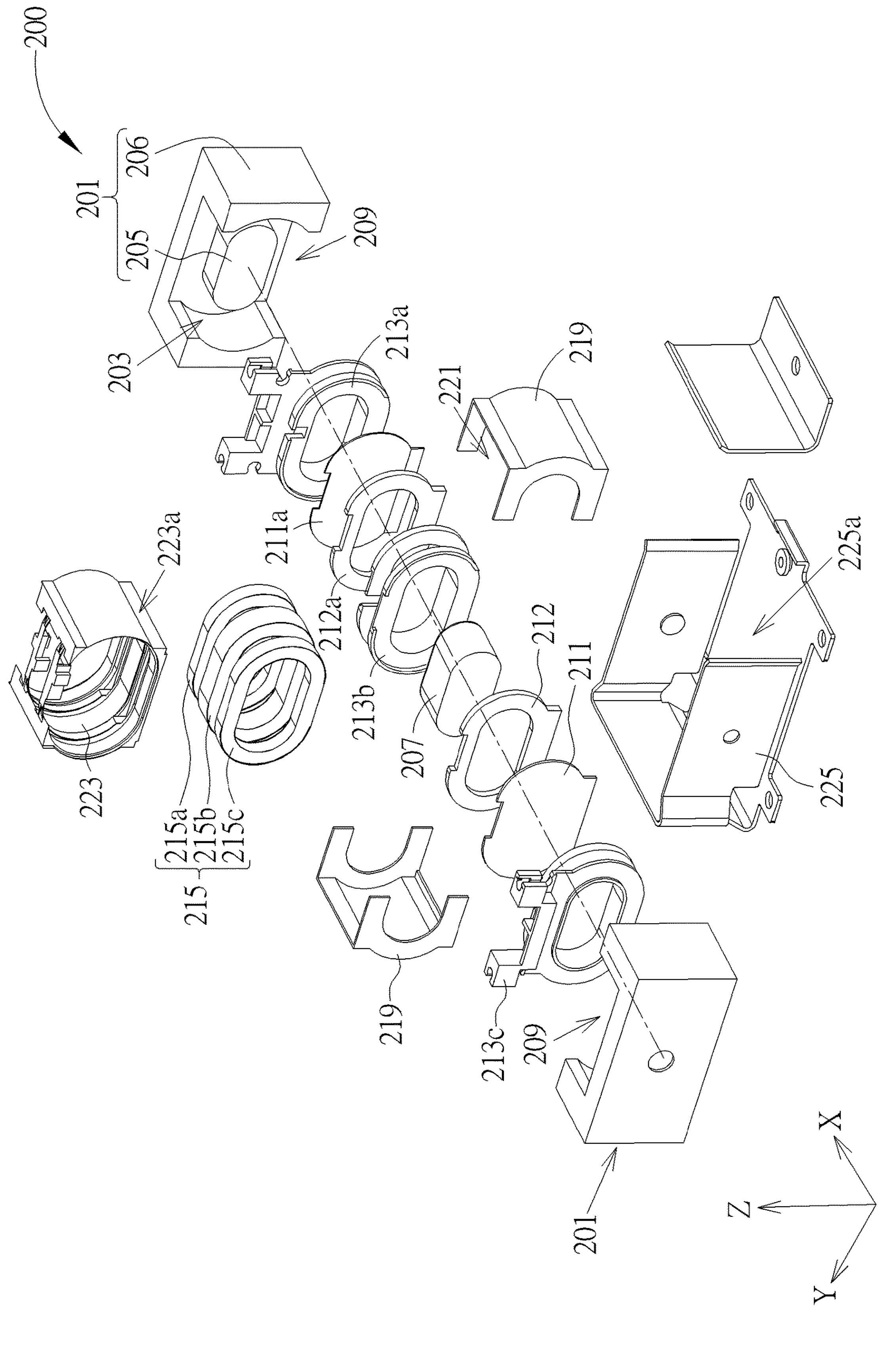
FIG. 6 is an exploded view of a magnetic component structure with thermal conductive filler in accordance with another embodiment of the present invention.
Figure 7:
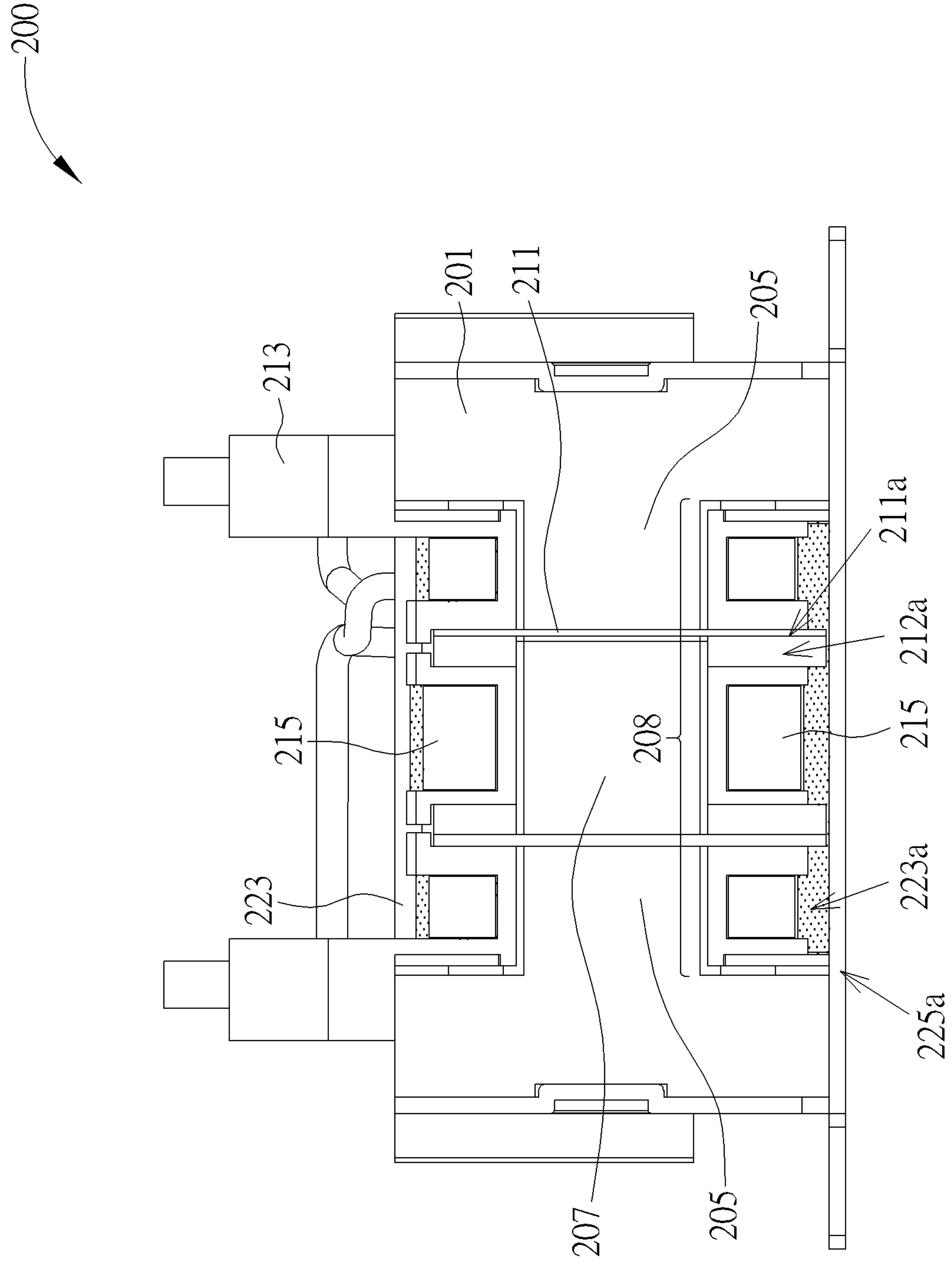
FIG. 7 is a cross-sectional view of a magnetic component structure after assembly in accordance with another embodiment of the present invention.

Please refer now to FIG. 6, which is an exploded view of a magnetic component structure with thermal conductivity filler in accordance with another embodiment of the present invention. FIG. 7 may also be referred collectively when reading the description of FIG. 6, to provide a better understanding about the configuration of the magnetic component structure after assembly, the cross-sectional composition in different orientations and relative positions and arrangements of elements in the magnetic component structure of the present invention, wherein FIG. 7 is a cross-section view in the Y direction of a magnetic component structure after assembly in accordance with this embodiment of the present invention.

Similarly, the magnetic component structure 200 in this embodiment include two external, opposite magnetic cores 201 with shapes preferably corresponding to each other and capable of assembling designedly to form an inner accommodating spacer 203 after assembly to accommodate and fix other components of the magnetic component structure 200. Preferably, each magnetic core 201 is provided with an end leg part 205 and two outer leg parts 206, wherein the end leg part 205 may be aligned and connected with a middle leg part 207 to constitute an inner leg structure (as 208 shown in FIG. 7) extending in the X direction for a bobbin to be sleeved thereon, while two sets of the connecting outer leg parts 206 constitute outer leg structures. In the present invention, an inner accommodating space 203 is formed between the two outer leg structures, wherein the inner leg structure 208 is set within the inner accommodating space 203. The cross-section of inner leg structure 208 may be circle, ellipse, oval or rectangle, etc. Spacers 211 and/or the middle leg part 207 may be optionally set in the inner leg structure 208. In the embodiment, spacers 211, such as ceramic spacer or mica spacer with thermal resistance and non-magnetic permeability, may be set between the middle leg part 207 and the end leg parts 205 to separate the two parts, which will be further described in later paragraphs relevant to the coil winding. The magnetic core 201 is further provided with at least one core opening 209 to allow the outward extension of internal components. The magnetic component structure 200 of present invention may adopt various magnetic cores 201, for example, EE core, UE core, UUI core, EI core, FF core, FL core, EQ core, EP core, ER core, ETD core, PM core and PQ core, wherein the outer leg structures and the inner leg structure 108 may be parts of the two magnetic cores 201, or may be individual, single outer leg structure or inner leg structure, or may be constituted by several leg parts of the magnetic cores. The present invention is compatible to all of these designs. The material of magnetic core 201 may be iron dust core with low magnetic permeability, such as Fe—Si alloy and Fe—Ni alloy, or ferrite core with higher magnetic permeability.

Among the internal components, a bobbin 213 (including three parts 213*a*-213*c*) may be sleeved on the aforementioned inner leg structure 208 (including middle leg part 207 and end leg parts 205 as shown in FIG. 7). The bobbin 213 may be in a form of oblong, hollow cylinder with dimensions generally designed to be accommodated in the inner accommodating spacer 203 formed by the magnetic cores 201. Bobbin 213 is provided with spaces and routes, such as winding slots, for coils to be wound therein or thereon. It may also be provided with connecting terminals to function as supports in coil winding and to provide conductive paths in PCB board soldering. Features like convexities, concavities and chamfers may also be provided in the structure to decide placement direction and pin order. The aforementioned features like connecting terminals, convexities or concavities in bobbin 213 may extend outside of the magnetic cores 201 through the core opening 209. The bobbin 213 in the embodiment of present invention may be horizontal type or vertical type, with material like thermal resistant and high strength polyphenylene Sulfide (PPS), phenolic resins (bakelite) or engineering plastics. Coil 215 is wound and assembled on the bobbin 213, with its terminals mounted on the convexity of the bobbin 213 and extending outside of the magnetic cores 201 through the core opening 209, as shown in FIG. 7. The type of coil 215 in the present invention may be copper sheet, copper foil, round wire, flat wire or stranded wire, like the coil 215 in the form of copper sheets shown in the embodiment. The coil 215 of present invention may be provided with several specific windings at relative positions with respect to the inner leg structure 208, which will be further described in later paragraphs relevant to the coil winding.

Different from the aforementioned embodiment, the bobbin 213 in this embodiment consists of three parts 213*a*, 213*b*, 213*c*, and the area of spacer 211 designedly exceeds the cross-sectional area of the inner leg structure 208, so that the spacers 211 function simultaneously as spacers between the middle leg part 207 and end leg parts 205 of the inner leg structure 208 and as spacers between the three parts 213*a*, 213*b*, 213*c* of the bobbin 213. In addition, a pad 212 may be added between the spacer 211 and the middle part 213*b* of the bobbin 213 to adjust fit tolerance.

In addition to the aforementioned bobbin 213 and coil 215, internal components may further include bobbin housing 219 surrounding the bobbin 213 and the coil 215. Bobbin housing 219 may be two opposite housing parts with a shape designed to correspond the inner accommodating space 203 formed by magnetic cores 201. The Bobbin housing 219 will be fixed in the magnetic cores 201 after assembly and surround most of the bobbin 213 and coil 215. At least one winding opening 221 will be formed after bobbin housing 219 is assembled, which faces or aligns with at least one core opening 209 of the magnetic cores 201. In this way, the bobbin 213 and coil 215 in bobbin housing 219 may extend outside of the magnetic cores 201 sequentially through the winding opening 221 and core opening 209. The material of bobbin housing 219 may be the same as the one of bobbin 213, such as polyphenylene Sulfide, phenolic resins. In the embodiment of present invention, the bobbin housing 219 is used not only to protect and fix the bobbin 213 and coil 215, but also provide the function of molding thermal conductive filler in order to achieve the invention purpose of local potting for the coil windings.

In the embodiment of present invention, thermal conductive filler 223 is formed between the bobbin housing 219 and bobbin 213. The material of thermal conductive filler 223 may be inorganic material with good thermal conductivity, such as epoxy, silicone, polyurethane (PU), or materials with thermal conductivity greater than 0.3 W/mk, such as thermosetting phenolic resins, thermoplastic polyethylene terephthalate (PET), polyamide (PA), polyphenylene sulfide (PPS) and polyetheretherketone (PEEK). In the embodiment of present invention, the thermal conductive filler 223 may be formed by first assembling the bobbin housing 219 and bobbin 213 (including the coil 215 winding thereon) and then performing a potting process with aforementioned materials. In this step, bobbin housing 219 and bobbin 213 function like molds to shape the thermal conductive filler 223. The potted thermal conductive material is filled in the space between bobbin housing 219 and bobbin 213 and encapsulates the coil 215 winding on the bobbin 213 (as the thermal conductive filler 123 shown in FIG. 7). The thermal conductive filler 223 as shown in FIG. 6 is therefore formed after the thermal conductive material solidifies. In the embodiment, preferably, the shaped thermal conductive filler 223 wouldn't exceed the winding opening 221 of bobbin housing 219. Instead, the thermal conductive filler 223 would extend outside of the core opening 209 through a lower winding opening 221 of the bobbin housing 219, to the thermal dissipating plate 225 (cooling surface) outsides the magnetic cores 201. The portions like connecting terminals, convexities and concavities of the bobbin 213 and terminals of the coil 215 are preferably not encapsulated by the thermal conductive filler 223 in order to extend outside of the magnetic cores 201 through the core opening 209 (as shown in FIG. 7).

In the embodiment of present invention, since the presence of bobbin housing 219 and the use of bobbin housing 219 and bobbin 213 as molds to shape the thermal conductive filler 223, the shaped thermal conductive filler 223 would be formed only in the space between the bobbin housing 219 and bobbin 213 and encapsulate the coil 215 in the space without contacting the inner surfaces of magnetic cores 201 in the inner accommodating space 203, and preferably, neither contacting the outer surfaces of magnetic cores 201, so as to achieve required efficacy of local potting for the coil windings in the present invention. The advantage of this design lies in the high power-consuming, high thermal-energy coil windings conducting the thermal energy through the high thermal conductive thermal conductive filler 223. Efficient thermal dissipation may be achieved due to shorter thermal conducting path. Preferably, the thermal conductive filler 223 would not contact the inner core surface in the inner accommodating space 203 of the magnetic cores 201 (as shown in FIG. 7), so that the heat generated by the coil 215 and conducted to the magnetic cores 201 through the thermal conductive filler 223 is decreased, to provide more uniform temperature profile for entire magnetic cores 201, therefore, need not to worry about the core cracking caused by local thermal stress exerted unevenly upon specific portions. Thermal energy resulted from the magnetic core 201 may be dissipated through other methods. In other words, the thermal energy generated by coil 215 and conducted to the thermal dissipating plate 225 (cooling surface) through the thermal conductive filler 223 is increased, while the heat generated by the coil 215 and conducted to the magnetic cores 201 through the thermal conductive filler 223 is decreased.

In the embodiment of present invention, the heat generated by the magnetic cores 201 and coil 215 may all be dissipated through an external thermal dissipating plate 225. As shown in FIG. 7, the assembled magnetic component structure 200 is set in the accommodating space provided by the thermal dissipating plate 225, and the thermal dissipating plate 225 may exert elastic force upon the two magnetic cores 201 from outsides to closely contact and fix the two magnetic cores 201, so that the heat radiated by the magnetic cores 201 may be dissipated through the thermal dissipating plate 225. Furthermore, portions of the thermal conductive filler 223, such as bottom portion 223*a*, may extend outwardly to closely contact the thermal dissipating plate 225 (ex. bottom plate 225*a*) through the winding opening 221 and core opening 209 at bottom, so that the heat radiated by the coil 215 may be dissipated sequentially through the thermal conductive filler 223 and the thermal dissipating plate 225. Thermal dissipating plate 225 may be high thermal conductive metal spring plate, with material like stainless steel, copper or die casting aluminum (ex. ADC12). The thermal dissipating plate 225 may be further connected with other thermal dissipating device, for example a water cooling system, to further improve its thermal dissipating effectiveness. In some embodiment, thermal dissipating plate 225 may be parts of the thermal dissipating device, and the thermal dissipating surfaces of thermal conductive filler 223 and magnetic cores 201 are thermal-conductively connected to the thermal dissipating plate 225 of the thermal dissipating device.

Different from the aforementioned embodiment, heat in the inner leg structure 208 of magnetic cores 201 may be further dissipated through the spacers 211 and/or pads 212. As shown in FIG. 7, spacers 211 and pads 212 are provided with extending portions 211*a*, 212*a*, which may extend outwardly to closely contact the bottom plate 225*a* of the thermal dissipating plate 225 through the winding opening 221 and core opening 209, so that the heat radiated by the coil 215 may be dissipated sequentially through the thermal conductive filler 223 and thermal dissipating plate 225. The advantage of this design lies in the heat in the inner leg structure 208 portion of magnetic cores 201 that is difficult to dissipate may be dissipated directly through the high thermal conductive spacers 211 and/or pads 212, to provide more uniform temperature profile for entire magnetic cores 201, therefore, need not to worry about the core cracking caused by local thermal stress exerted unevenly upon specific portions. Preferably, the extending portions 211*a*, 212*a* of the spacers 211 and pads 212 don't contact the thermal conductive filler 223.

Figure 8:
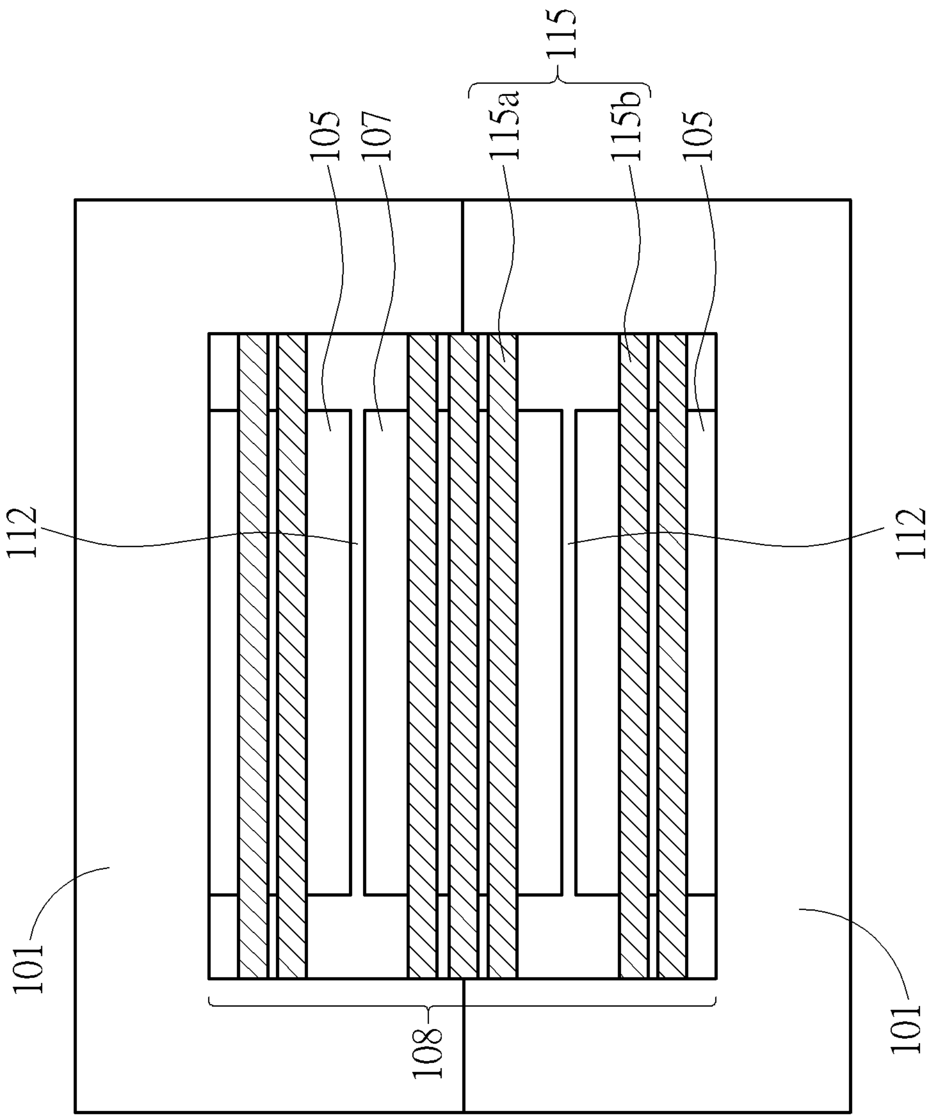
FIG. 8 is a cross-sectional view illustrating the parts of magnetic cores, coil and inner leg structure of the magnetic component structure in accordance with the preferred embodiment of the present invention.
Figure 9:
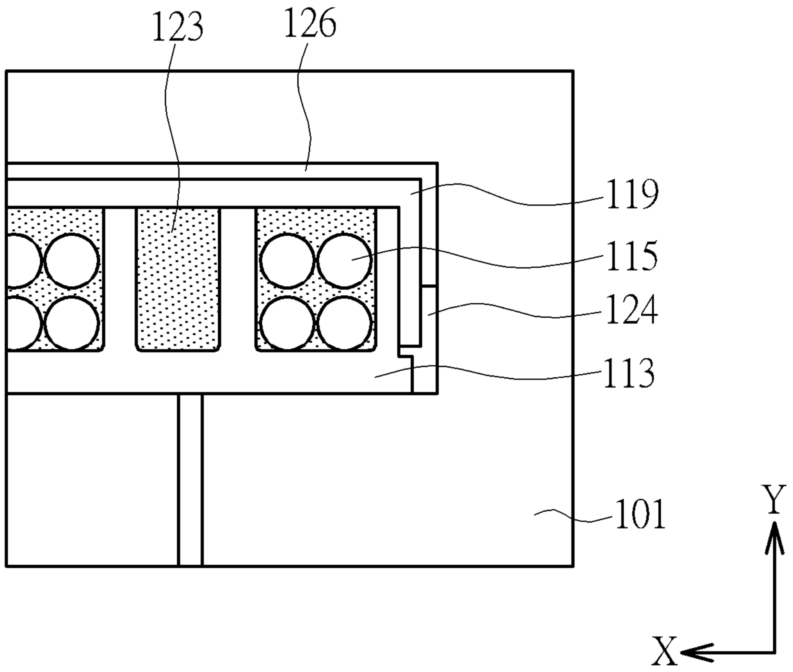
FIGS. 9-13 are partially enlarged cross-sectional views of the magnetic component structure with thermal conductive filler in accordance with the preferred embodiment of present invention.

Please refer now to FIG. 8, which is a cross-sectional view illustrating the magnetic cores 101, coil 115 and middle leg part 107 of the magnetic component structure 100 after assembly in accordance with the preferred embodiment of present invention. In the present invention, the coil 115 is designedly provided with specific coil windings. As shown in the figure, the coil 115 is divided into a first coil winding 115*a* sleeved on the middle section (i.e. the middle leg part 107) of the inner leg structure 108 and two second coil windings 115*b* sleeved at two sides of the first coil winding 115*a*. The first coil winding 115*a* is spaced apart from the second coil windings 115*b* at two sides by gaps 112. The first coil winding 115*a* and the two second coil windings 115*b* do not enclose the two of gaps 112 between the middle leg part 107 and the two end leg part 105 such that the gaps 112 are exposed. Non-magnetically permeable material or low magnetically permeable material with magnetic permeability lower than the one of the magnetic cores 101 or inner leg structure 108 may be set in the gap 112. More specifically, the first coil winding 115*a*, second coil windings 115*b* of the coil 115 would not encapsulate the gaps 112. In previous embodiments, spacers 111 or 211 are set in the gaps 112 (as shown in FIG. 5 and FIG. 7). In this embodiment, the advantage of forming gaps 112 (or spacer 111) between the magnetic cores 101 and middle leg part 107 is that the total inductance of the first coil winding 115*a* and second coil windings 115*b* may be efficiently improved by adjusting the position of gap 112 in the inner leg structure 108, especially in the case that there are two gaps as shown in FIG. 8, to further increase the adjustable range of total inductance, i.e. including magnetizing inductance and leakage inductance at the same time. In addition, material with magnetic conductivity may be further provided between the first coil winding and second coil winding to improve magnetic permeability and coupling coefficient in order to reduce the overall volume of the magnetic components. The embodiment shown in FIG. 6 may also adopt the aforementioned specific coil winding design, with difference that the bobbin is divided into three parts 213*a*, 213*b*, 213*c*, which correspond respectively to the first coil winding 215*a*, second coil winding 215*b* and first coil winding 215*c*. In the embodiment, two gaps 112 are formed respectively at two sides of the second coil winding 215*b*, and the total inductance of first coil winding 215*a* and second coil winding 215*b* may be respectively adjusted by adjusting the parameters like positions, spacings, cross-sectional areas, shapes, magnetically conductive materials of the two gaps 112. In comparison to single gap design, available total inductance range of the first coil winding 215*a* and second coil winding 215*b* is larger and easy to achieve in this design.

Please refer now to FIGS. 9-13, which are partially enlarged cross-sectional views of the magnetic component structure with thermal conductive filler in accordance with the preferred embodiment of present invention, to describe various filling schemes of the thermal conductive filler in the magnetic components of present invention. First, in FIG. 9, the thermal conductive filler 123 is formed only between the bobbin 113 and the bobbin housing 119 (i.e. local potting) and encapsulates the coil 115. The thermal conductive filler 123 doesn't contact the inner surfaces of the magnetic cores 101 in the inner accommodating space and the outer surface of the magnetic cores 101 at all. Structures like bobbin 113, bobbin housing 119, gap 124 or liner 126 are set between the heat source coil 115 (including the surrounding thermal conductive filler 123 for conducting heat) and another heat source coil 101, so that the heat generated by the coil windings with greater heat output and conducted to the surrounding core portions may be decreased, which may lower correspondingly the stress of magnetic cores by 30%. The gap 124 may be filled with air or thermal insulation material which thermal conductivity is lower than the thermal conductive filler 123.

Figure 10:
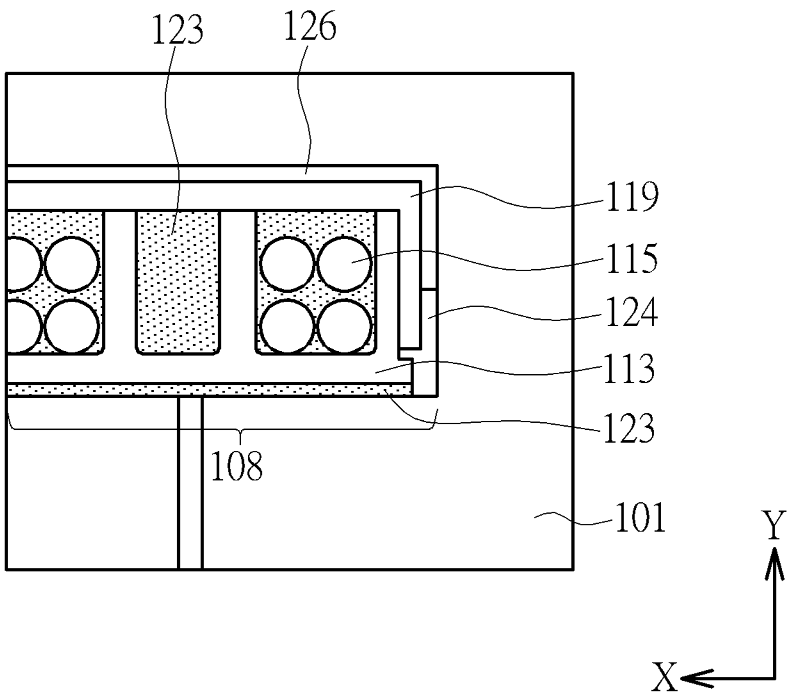

In FIG. 10, in addition to the space between bobbin 113 and bobbin housing 119, thermal conductive filler 123 may also be formed between the bobbin 113 and the inner leg structure 108 of magnetic cores 101 to improve the effectiveness of thermal dissipation from the inner leg structure 108 portion. The thermal conductive filler 123 is partially set on the surface of inner leg structure 108 in this case, so that the thermal conductive filler 123 may contact only the inner leg structure 108 portion in the inner accommodating space 103, which may lower correspondingly the stress of magnetic cores by 12.5%.

Figure 11:
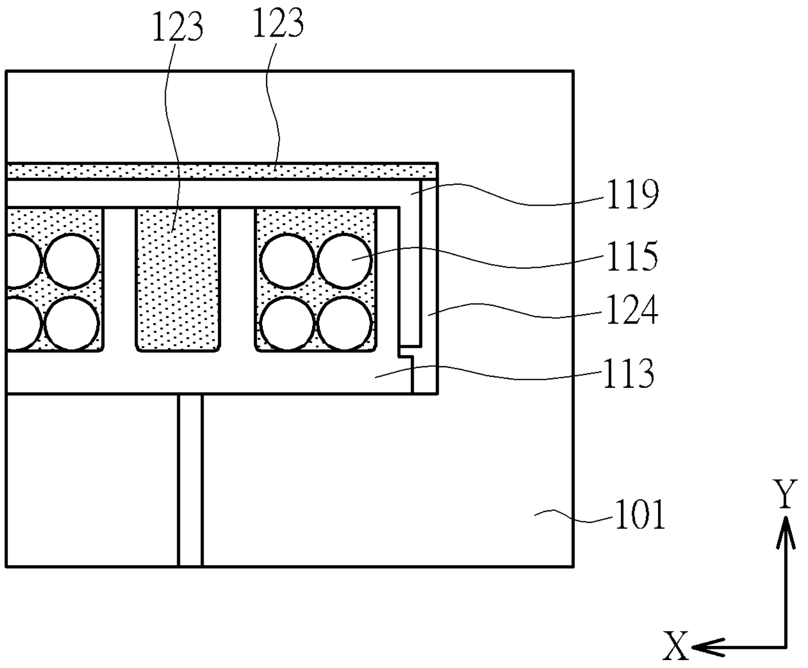

In FIG. 11, in addition to the space between bobbin 113 and bobbin housing 119, thermal conductive filler 123 may also be formed between the bobbin 113 and the inner sidewalls of the two outer leg structures in the X direction to improve the effectiveness of thermal dissipation from said core portion. Gap 124 is formed between the bobbin 113 and an inner sidewall of the magnetic core 101 in the Y direction to prevent the heat generated by the coil winding being conducted to said core portion. The thermal conductive filler 123 is partially set on the inner surfaces of the two outer leg structures of magnetic cores 101 in this case, so that the thermal conductive filler 123 may contact only the inner surface portions of the two outer leg structures in the inner accommodating space 103, which may lower correspondingly the stress of magnetic cores by 17.5%.

Figure 12:
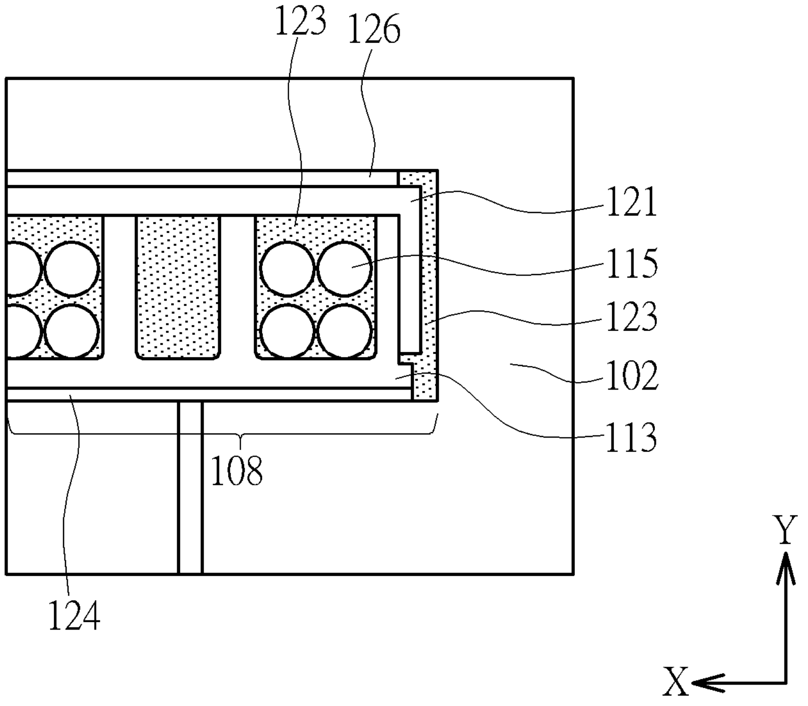

In FIG. 12, in addition to the space between bobbin 113 and bobbin housing 119, thermal conductive filler 123 may also be formed between the bobbin 113 and the inner sidewalls of the two plate portions 102 of the magnetic cores 101 in the Y direction to improve the effectiveness of thermal dissipation from said core portion. A liner 126 is set between the bobbin 113 and an inner sidewall of the magnetic core 101 in the X direction and a gap 124 is formed between the bobbin 113 and the inner leg structure 108 to prevent the heat generated by the coil winding being conducted to the inner leg structure 108. The thermal conductive filler 123 is partially set on the inner surfaces of the two plate portions 102 of the magnetic cores 101 in this case, so that the thermal conductive filler 123 may contact only the inner surface of the two plate portions 102 in the inner accommodating space 103, which may lower correspondingly the stress of magnetic cores by 7.5%.

Figure 13:
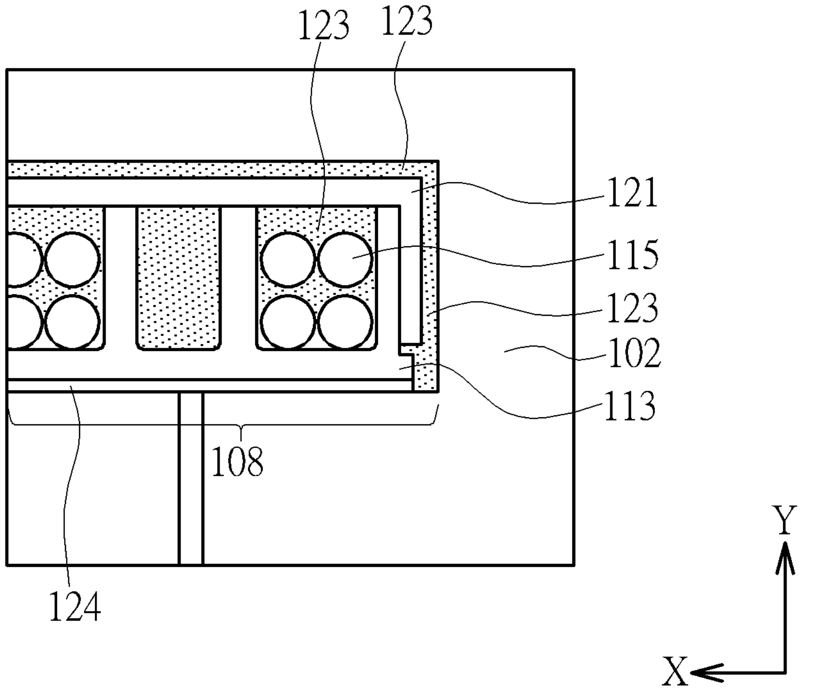

In FIG. 13, in addition to the space between bobbin 113 and bobbin housing 119, thermal conductive filler 123 may also be formed both between the bobbin 113 and the inner surfaces of the two outer leg structures of the magnetic cores 101 in the X direction and between the bobbin 113 and the inner sidewalls of the two plate portions 102 the magnetic cores 101 in the Y direction, to improve the effectiveness of thermal dissipation from those core portions. A gap 124 is formed between the bobbin 113 and the inner leg structure 108 to prevent the heat generated by the coil winding being conducted to the inner leg structure 108. The thermal conductive filler 123 is partially set on the inner surfaces of the two plate portions 102 and the two outer leg structures of the magnetic cores 101 in this case, so that the thermal conductive filler 123 may contact only the inner surfaces of the two plate portions 102 and the inner surfaces of two outer leg structures in the inner accommodating space 103, which may lower correspondingly the stress of magnetic cores by 2.5%.

The thermal conductive filler 123 may lower maximum amount stress in the magnetic cores 101 if it doesn't contact the inner surfaces of the magnetic cores 101 in the inner accommodating space 103 at all. Secondly, the thermal conductive filler 123 would not contact the inner surfaces of the two plate portions and/or the inner surfaces of the two outer leg structures. Ideally, the thermal conductive filler 123 doesn't contact the outer surfaces of the magnetic cores at all. In this embodiment, the thermal conductive filler 123 may be partially set on parts of the outer surfaces of the magnetic cores in a small amount, for example on the outer surface of the two plate portions 102 of the magnetic cores 101.

According to the descriptions of the aforementioned embodiments of FIGS. 9-13, gaps may be set designedly between the coil windings and the magnetic cores (including the inner leg structure) or thermal conductive filler 123 or liner may be set or formed in those gas, to prevent the heat generated by the coil windings with greater heat output being conducted to the surrounding core portions, thereby preventing the cracking of fragile cores at those portions due to uneven local thermal stress.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A magnetic component structure with thermal conductive filler, comprising:

two magnetic cores assembling together to form an inner accommodating space and at least one core opening and with two plate portions connecting each other through an inner leg structure and two outer leg structure, wherein said inner leg structure is in said inner accommodating space;

a bobbin sleeving on said inner leg structure;

a coil winding on said bobbin;

a bobbin housing surrounding said bobbin and said coil winding to form at least one winding opening facing said at least one core opening, wherein gaps are formed between said magnetic cores and an encasing structure constituted by said bobbin housing and said bobbin;

a thermal conductive filler formed between said bobbin and said bobbin housing and encapsulating at least parts of said coil winding; and a cooling surface contacting said magnetic cores and said thermal conductive filler, and said thermal conductive filler extending outwardly to contact said cooling surface through said at least one core opening and said at least one winding opening.

2. The magnetic component structure with thermal conductive filler of claim 1, further comprising a thermal dissipating plate contacting said cooling surface and set at outer sides of said two magnetic cores and exerting elastic force upon said two magnetic cores to fix said two magnetic cores, and parts of said thermal conductive filler extend outwardly to closely contact said thermal dissipating plate through said at least one winding opening and said at least one core opening.

3. The magnetic component structure with thermal conductive filler of claim 1, wherein in said inner accommodating space, said thermal conductive filler doesn't contact said inner leg structure, inner surfaces of said two outer leg structures and inner surfaces of said two plate portions.

4. The magnetic component structure with thermal conductive filler of claim 1, further comprising at least one spacer being set in said inner leg structure.

5. The magnetic component structure with thermal conductive filler of claim 4, wherein said spacer extends outwardly to said cooling surface through said at least one winding opening and said at least one core opening.

6. The magnetic component structure with thermal conductive filler of claim 1, wherein said inner leg structure is provided with a middle leg part and two end leg parts, and said two end leg parts connect each other through said middle leg part and thereby constitute said inner leg structure, and said bobbin sleeves on said inner leg structure, and gaps are formed between said two end leg parts and said middle leg part.

7. The magnetic component structure with thermal conductive filler of claim 6, wherein said coil winding further comprises a first winding and two second windings at two sides of said first winding, and said first winding sleeves on said middle leg part of said inner leg structure, and said two second windings sleeve respectively on said two end leg parts of said inner leg structure of said two magnetic cores, and said first winding and said two second windings are spaced apart by a spacing and do not enclose two of said gaps between said middle post leg and said two end leg parts.

8. The magnetic component structure with thermal conductive filler of claim 7, wherein said bobbin is divided into three parts by said two gaps, and said three parts sleeve respectively on said middle leg part and said two end leg parts, and said first winding and said two second windings wind respectively on said three parts.

9. The magnetic component structure with thermal conductive filler of claim 1, wherein in said inner accommodating space, said thermal conductive filler doesn't contact inner surfaces of said two plate portions.

10. The magnetic component structure with thermal conductive filler of claim 1, wherein in said inner accommodating space, said thermal conductive filler doesn't contact inner surfaces of said two outer leg structures.

11. The magnetic component structure with thermal conductive filler of claim 1, wherein a thermal conductivity of said thermal conductive filler is greater than 0.3 W/mk, and a material of said thermal conductive filler comprises epoxy, silicone, polyurethane (PU), phenolic resins, thermoplastic polyethylene terephthalate (PET), polyamide (PA), polyphenylene sulfide (PPS) and polyetheretherketone (PEEK).

12. The magnetic component structure with thermal conductive filler of claim 1, wherein said magnetic core comprises high thermal conductivity iron-based materials.

13. The magnetic component structure with thermal conductive filler of claim 12, wherein a thermal conductivity of said thermal conductive filler is smaller than a thermal conductivity of said magnetic core.

14. The magnetic component structure with thermal conductive filler of claim 12, wherein a thermal conductivity of said bobbin housing is smaller than thermal conductivities of said magnetic core and said thermal conductive filler.

15. The magnetic component structure with thermal conductive filler of claim 14, wherein said thermal conductivity of said thermal conductive filler is at least ten times higher than said thermal conductivity of said magnetic core.

16. The magnetic component structure with thermal conductive filler of claim 14, wherein said thermal conductive filler doesn't contact outer surfaces of said two magnetic cores.

* * * * *